United States Patent
Tai et al.

(10) Patent No.: US 9,201,190 B2
(45) Date of Patent: Dec. 1, 2015

(54) DISPLAY DEVICE

(71) Applicant: E Ink Holdings Inc., Hsinchu (TW)

(72) Inventors: Sheng-Chieh Tai, Hsinchu (TW); I-Jeng Chen, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 61 days.

(21) Appl. No.: 14/273,544

(22) Filed: May 9, 2014

(65) Prior Publication Data

US 2015/0117054 A1  Apr. 30, 2015

(30) Foreign Application Priority Data

Oct. 24, 2013  (TW) .............................. 102138516 A (51) Int. Cl.
*F21V 8/00* (2006.01)

(52) U.S. Cl.
CPC ............ *G02B 6/0073* (2013.01); *G02B 6/0031* (2013.01)

(58) Field of Classification Search
CPC ............................ G02B 6/0031; G02B 6/0073
See application file for complete search history.

(56) References Cited

U.S. PATENT DOCUMENTS 8,235,573 B2 * 8/2012 Chang .................. G02B 6/0025
362/610
8,834,003 B2 * 9/2014 Huang .................... H01L 33/58
362/612

FOREIGN PATENT DOCUMENTS

CN       101833187       9/2010
CN       102086993       6/2011

OTHER PUBLICATIONS

"Office Action of Taiwan Counterpart Application", issued on Sep. 3, 2015, p. 1-p. 5, in which the listed references were cited.

* cited by examiner

*Primary Examiner* — Stephen F Husar
(74) *Attorney, Agent, or Firm* — Jianq Chyun IP Office (57) ABSTRACT

A display device includes a display panel, a light guide plate (LGP), a light source, and a positioning component. The LGP is disposed on a display surface of the display panel and has an upper surface and a lower surface opposite to each other, a light-incident surface, a first light-guiding block, and a second light-guiding block. A display area of the display panel corresponds to the first light-guiding block. The second light-guiding block extends outside the display area and has at least one recess portion. The recess portion is located on at least one of the upper surface and the lower surface and extends to the light-incident surface. The light source is disposed beside the light-incident surface. The positioning component is disposed on the second light-guiding block and located in the recess portion. Besides, the positioning component extends outside the recess portion and fixes the location of the light source.

17 Claims, 5 Drawing Sheets

DISPLAY DEVICE

CROSS-REFERENCE TO RELATED APPLICATION

This application claims the priority benefit of Taiwan application serial no. 102138516, filed on Oct. 24, 2013. The entirety of the above-mentioned patent application is hereby incorporated by reference herein and made a part of this specification.

BACKGROUND OF THE INVENTION

1. Field of the Invention

The invention relates to a display device, and more particularly, to a display device having a front-light module.

2. Description of Related Art

With the advance in information industry, electronic products with multiple functions (e.g., a display function, a touch-control function, a three-dimensional display function, and so on) have gained popularity due to the convenient use of the electronic products. Currently, these electronic products are characterized by multi-functionality mostly through add-on modules or equipment. For instance, when an electronic device is required to perform the display function and the touch-control function at the same time, the touch panel and the display panel may be adhered to each other by sealant, so as to construct the required electronic device. Certainly, in order to improve the display quality, a front-light module may be additionally adhered or assembled to the front of the display panel (e.g., an electrophoretic display panel) capable of performing the display function, and thereby the required electronic device is obtained.

To be specific, the conventional front-light module is constituted by a light source and a light guide plate (LGP). The two opposite surfaces of the LGP are planar surfaces, and the light source is located at the light-incident side of the LGP. Besides, in order to fix its location and supply power, the light source requires a circuit board. The circuit board is often placed on one of the surfaces of the LGP; in addition, the circuit board may be extended outside the LGP and electrically and structurally connected to the light source. At this time, the overall thickness of the electronic device increases because of the circuit board placed on the surface of the LGP. In another aspect, if any other component is subsequently required to be placed in front of the LGP, the thickness of an optical adhesive layer for adhering the LGP to other components must be greater than the thickness of the circuit board, so as not to interfere with the circuit board. As a result, the overall thickness of the electronic device cannot be effectively reduced.

SUMMARY OF THE INVENTION

The invention is directed to a display device with a reduced thickness.

In an embodiment of the invention, a display device that includes a display panel, a light guide plate (LGP), a light source, and a positioning component is provided. The display panel has a display surface. The LGP is disposed on the display surface of the display panel and has an upper surface and a lower surface opposite to each other, a light-incident surface, a first light-guiding block, and a second light-guiding block. A display area of the display panel corresponds to the first light-guiding block. The second light-guiding block extends outside the display area of the display panel and has at least one recess portion. The recess portion is located on at least one of the upper surface and the lower surface and extends to the light-incident surface. The light source is disposed beside the light-incident surface of the LGP. The positioning component is disposed on the second light-guiding block of the LGP and located in the recess portion. Besides, the positioning component extends outside the recess portion and fixes the location of the light source.

According to an embodiment of the invention, the positioning component is a flexible circuit board, and the positioning component is electrically and structurally connected to the light source.

According to an embodiment of the invention, the recess portion is located on the upper surface, and the positioning component is located in the recess portion.

According to an embodiment of the invention, the recess portion is located on the lower surface, and the positioning component is located in the recess portion.

According to an embodiment of the invention, the display device further includes a light-shielding component. The number of the at least one recess portion is two. The recess portions are respectively located on the upper surface and the lower surface and extend to the light-incident surface. The light-shielding component and the positioning component are respectively located in the recess portions.

According to an embodiment of the invention, a surface of the light-shielding component away from the at least one recess portion is aligned to or lower than the lower surface of the LGP.

According to an embodiment of the invention, the light-shielding component is a black tape layer or a white tape layer.

According to an embodiment of the invention, the display device further includes a connection component that is connected to the display panel and extends toward the recess portion located on the lower surface. Besides, the connection component includes a flexible circuit board, a passive component, or a driving chip.

According to an embodiment of the invention, the positioning component is a reflection mask. The number of the at least one recess portion is two. The recess portions are respectively located on the upper surface and the lower surface and extend to the light-incident surface. Two respective sides of the positioning component are respectively located in the recess portions, the positioning component and the LGP define an accommodation space, and the light source is located in the accommodation space.

According to an embodiment of the invention, the display device further includes a light-shielding component disposed on the second light-guiding block of the LGP.

According to an embodiment of the invention, the display device further includes an optical adhesive layer disposed between the first light-guiding block of the LGP and the display panel.

According to an embodiment of the invention, the display device further includes a touch panel and an optical adhesive layer. The touch panel is disposed on the upper surface of the LGP, and a dimension of the touch panel is greater than a dimension of the display panel. The optical adhesive layer is disposed between the first light-guiding block of the LGP and the touch panel.

According to an embodiment of the invention, the display device further includes a first optical adhesive layer, a touch panel, a cover plate, and a second optical adhesive layer. The first optical adhesive layer is disposed between the first light-guiding block of the LGP and the display panel. The touch panel is disposed between the first optical adhesive layer and the display panel. The cover plate is disposed on the upper surface of the LGP, and a dimension of the cover plate is greater than a dimension of the display panel. The second optical adhesive layer is disposed between the first light-guiding block of the LGP and the cover plate.

According to an embodiment of the invention, the display device further includes an optical film layer and an optical adhesive layer. The optical film layer is disposed on the upper surface of the LGP. The optical adhesive layer is disposed between the first light-guiding block of the LGP and the optical film layer.

According to an embodiment of the invention, the recess portion has a bottom surface and a side surface. The side surface is connected to the bottom surface and the upper surface of the LGP, and the bottom surface is perpendicular to the light-incident surface.

According to an embodiment of the invention, the side surface includes a vertical surface, an inclined surface, or an arc-shaped surface.

According to an embodiment of the invention, the light source is a plurality of light-emitting diodes (LEDs), and a light-emitting area of the light source is substantially equal to or smaller than an area of the light-incident surface.

In view of the above, the LGP described herein has at least one recess portion in a region (i.e., the second light-guiding block) not corresponding to the display surface of the display panel, and the positioning component is located in the recess portion. Conventionally, the flexible circuit board electrically connected to the light source is located on the surface of the LGP; compared to the related art, the recess portion described in an embodiment of the invention reduces the height difference between the positioning component and the LGP. Thereby, the display device described herein may have the reduced thickness.

Several exemplary embodiments accompanied with figures are described in detail below to further describe the invention in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the invention.

DETAILED DESCRIPTION OF DISCLOSED EMBODIMENTS

Figure 1A:
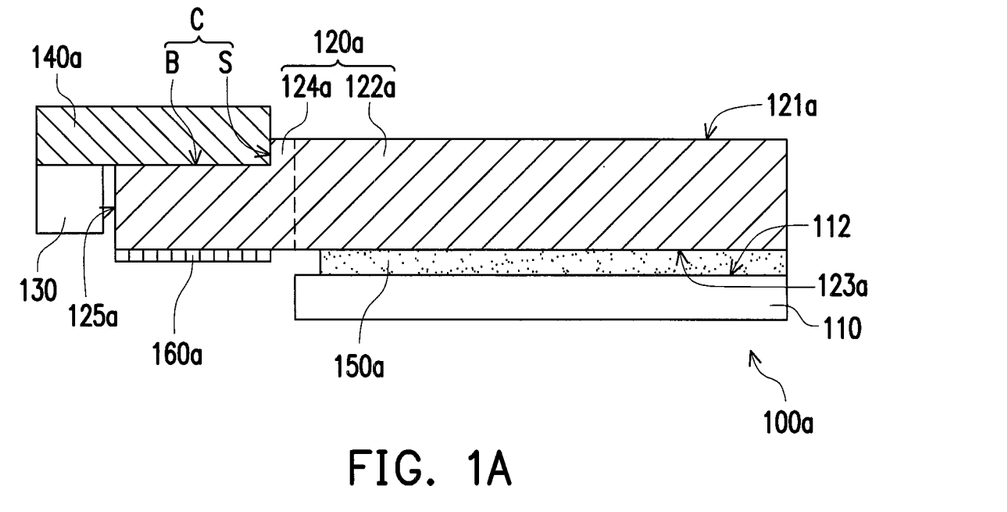
FIG. 1A is a schematic cross-sectional view illustrating a display device according to an embodiment of the invention.

FIG. 1A is a schematic cross-sectional view illustrating a display device according to an embodiment of the invention. With reference to FIG. 1A, in the present embodiment, the display device 100a includes a display panel 110, a light guide plate (LGP) 120a, a light source 130, and a positioning component 140a. The display panel 110 has a display surface 112. The LGP 120a is disposed on the display surface 112 of the display panel 110 and has an upper surface 121a and a lower surface 123a opposite to each other, a light-incident surface 125a, a first light-guiding block 122a, and a second light-guiding block 124a. The display panel 110 corresponds to the first light-guiding block 122a, and the second light-guiding block 124a extends outside the display panel 110. As shown in FIG. 1A, the display panel 110 is completely located within the first light-guiding block 122a, however, the invention is not limited thereto as long as the display area of the display panel 110 is located within the first light-guiding block 122a, and the second light-guiding block 124a extends outside the display area of the display panel 110. The second light-guiding block 124a has at least one recess portion C (only one is schematically depicted in FIG. 1A), and the recess portion C is located on the upper surface 121a of the LGP 120a and extends to the light-incident surface 125a. The light source 130 is disposed beside the light-incident surface 125a of the LGP 120a, and there is a distance between the light source 130 and the light-incident surface 125a of the LGP 120a. The positioning component 140a serves to secure the light source 130. Besides, the positioning component 140a is disposed on the second light-guiding block 124a of the LGP 120a and in the recess portion C, and the positioning component 140a extends outside the recess portion C and is connected to the light source 130.

To be specific, the display panel 110 described in the present embodiment is, for instance, a reflective display panel (e.g., an electrophoretic display panel), while the invention is not limited thereto. The LGP 120a is disposed on the display surface 112 of the display panel 110, i.e., in front of the display panel 110, and therefore the assembly of the LGP 120a and the light source 130 may be deemed as one front-light module. Here, the light source 130 is, for instance, constituted by a plurality of point light sources, e.g., a plurality of light-emitting diodes (LEDs). In another embodiment, the light source 130 may also be a cold cathode fluorescent lamp (CCFL), which should not be construed as a limitation to the invention. Besides, a light-emitting area of the light source 130 is substantially equal to or smaller than an area of the light-incident surface 125a of the LGP 120a, so as to ensure that the light emitted from the light source 130 may be guided by the LGP 120a.

Figure 1B:
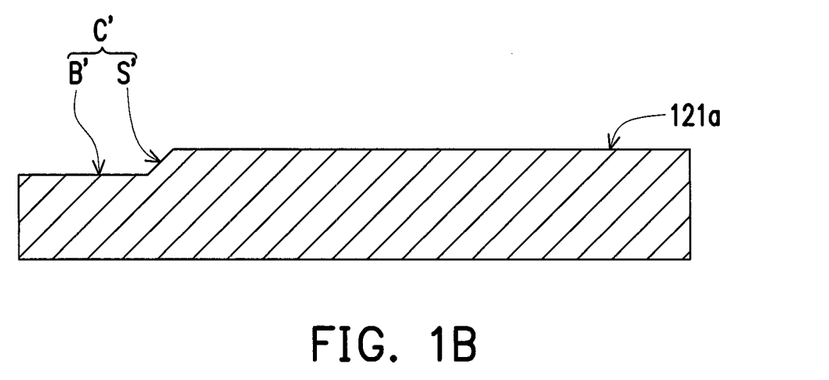
FIG. 1B is a schematic cross-sectional view illustrating a light guide plate (LGP) in the display device depicted in FIG. 1A according to another embodiment of the invention.
Figure 1C:
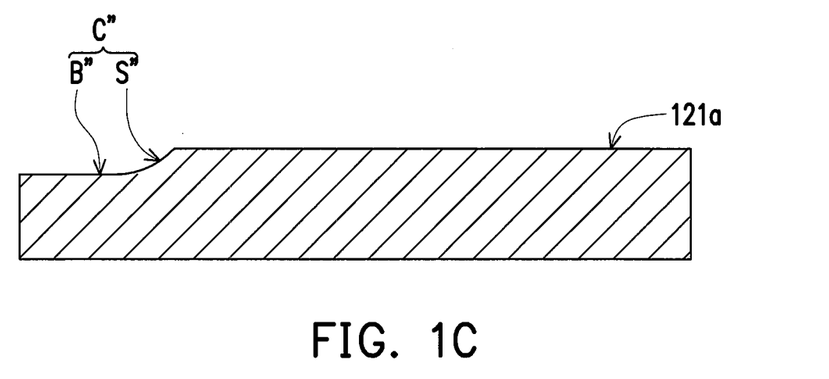
FIG. 1C is a schematic cross-sectional view illustrating an LGP in the display device depicted in FIG. 1A according to yet another embodiment of the invention.

In the present embodiment, the recess portion C of the second light-guiding block 124a of the LGP 120a has a bottom surface B and a side surface S, the side surface S is connected to the bottom surface B and the upper surface 121a of the LGP 120a, and the bottom surface B is perpendicular to the light-incident surface 125a. As illustrated in FIG. 1A, the side surface S of the recess portion C described in the present embodiment is a vertical surface, i.e., the side surface S is perpendicular to both the upper surface 121a of the LGP 120a and the bottom surface B of the recess portion C. However, the structure of the recess portion C of the LGP 120a is not limited herein. In another embodiment of the invention, as shown in FIG. 1B, the side surface S' of the recess portion C' is connected to the upper surface 121a and the bottom surface B', and the side surface S' is an inclined surface. Alternatively, as shown in FIG. 1C, the side surface S" or the recess portion C'" is connected to the upper surface 121a and the bottom surface B", and the side surface S" is an arc-shaped surface. The technical schemes shown in FIG. 1A to FIG. 1C are feasible according to embodiments of the invention and do not depart from the scope of the invention.

With reference to FIG. 1A, the positioning component 140a described in the present embodiment is a flexible circuit board and is electrically and structurally connected to the light source 130, so as to fix the location of the light source 130 and drive the light source 130. In order to enhance the adhesion between the display panel 100a and the LGP 120a, the display device 100a may further include an optical adhesive layer 150a disposed between the first light-guiding block 122a and the display panel 110. Besides, to improve the display quality of the display device 100a, the display device 100a described in the present embodiment may further include a light-shielding component 160a disposed on the second light-guiding block 124a of the LGP 120a and on the lower surface 123a. Here, the light-shielding component 160a is opposite to the positioning component 140a. The light-shielding component 160a is, for instance, a black tape layer or a white tape layer and can effectively reflect and scatter the light entering the LGP 120a from the light source 130, such that the light entering the display panel 110 may be distributed evenly.

In the present embodiment, the second light-guiding block 124a of the LGP 120a has the recess portion C, and the positioning component 140a is located in the recess portion C. Conventionally, the circuit board electrically connected to the light source is disposed on the surface of the LGP; compared to the related art, the recess portion C described in an embodiment of the invention effectively reduces the height difference between the positioning component 140a and the LGP 120a. Thereby, the display device 100a described herein may have the reduced thickness. Besides, the display device 100a described herein is equipped with the light-shielding component 160a that is able to effectively reflect and scatter the light entering the LGP 120a from the light source 130, such that the light entering the display panel 110 may be distributed evenly. As a result, the LGP 120c and the light-shielding component 160a together effectively resolve the issue of bright zones occurring at the light-incident surface 125a of the LGP 120a. In brief, the display device 100a described herein is characterized by the reduced thickness and the favorable display quality.

It should be mentioned that reference numbers and some descriptions provided in the previous exemplary embodiment are also applied in the following exemplary embodiment. The same reference numbers represent the same or similar components in these exemplary embodiments, and repetitive descriptions are omitted. The omitted descriptions may be referred to as those described in the previous exemplary embodiments.

Figure 2:
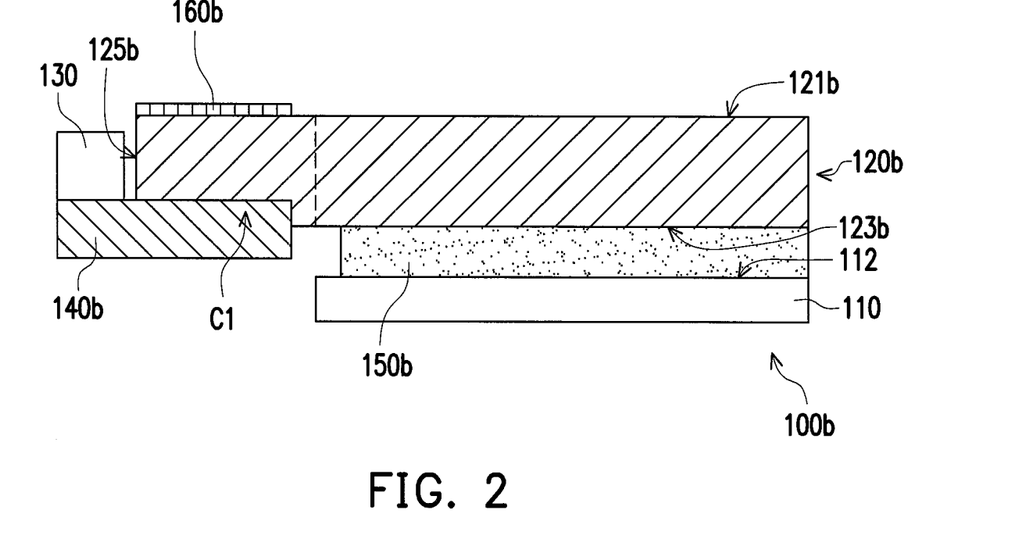
FIG. 2 is a schematic cross-sectional view illustrating a display device according to another embodiment of the invention.

FIG. 2 is a schematic cross-sectional view illustrating a display device according to another embodiment of the invention. With reference to FIG. 1A and FIG. 2, the display device 100b described in the present embodiment is similar to the display device 100a depicted in FIG. 1A, while one of the differences therebetween lies in that the recess portion C1 described in the present embodiment is located on the lower surface 123b of the LGP 120b and extended to the light-incident surface 125b. Here, the positioning component 140b is located in the recess portion C1, and the light-shielding component 160b is located on the upper surface 121b. Here, the thickness of the positioning component 140b is greater than the thickness of the light-shielding component 160b, and thus the thickness of the optical adhesive layer 150b is also required to be greater than that of the optical adhesive layer 150a, so as to prevent mutual interference between the light-shielding component 160b and the display panel 110. In most cases, according to the related art, to prevent the interference with the circuit board disposed on the surface of the LGP, the thickness of the resultant optical adhesive layer is from 10 µm to 300 µm. However, since the positioning component 140b described in the present embodiment is located in the recess portion C1, the thickness of the optical adhesive layer 150b is less than that of the conventional optical adhesive layer, and the difference in the thicknesses is about the height of the recess portion C1. In a word, the thickness of the optical adhesive layer 150b described herein is apparently less than that of the conventional optical adhesive layer (to prevent the interference with the circuit board), and thus the display device 100b described in the present embodiment may have the reduced thickness.

The light-shielding components 160a and 160b located on the second light-guiding block 124a are opposite to the positioning components 140a and 140b. Nevertheless, in other embodiments that are not shown in the drawings, the light-shielding component and the positioning component may be located on the same side, i.e., simultaneously located in the recess portion; alternatively, the positioning component may be located in the recess portion, and the light-shielding component is located on the upper surface of the LGP. The above-mentioned technical schemes are feasible according to embodiments of the invention and do not depart from the scope of the invention.

Figure 3:
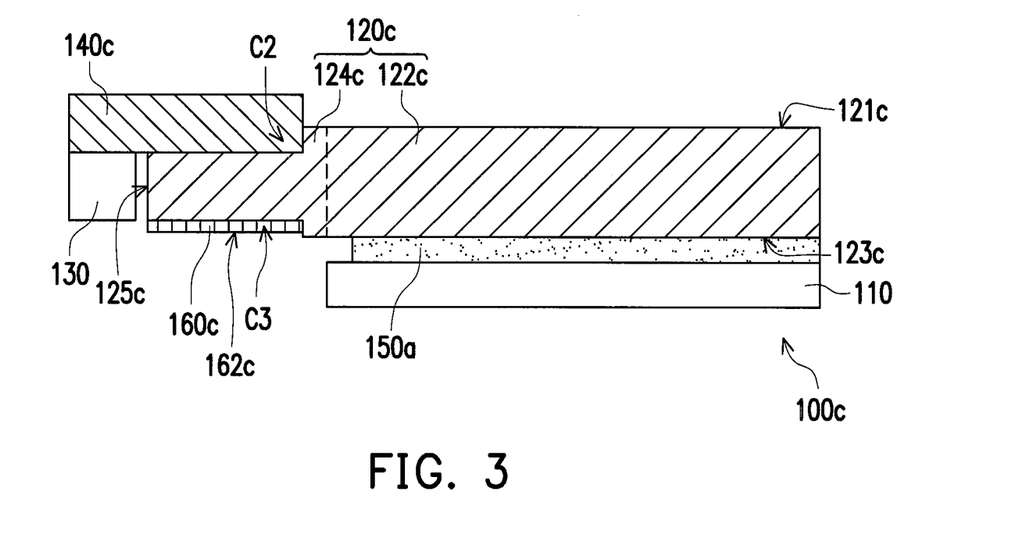
FIG. 3 is a schematic cross-sectional view illustrating a display device according to another embodiment of the invention.

FIG. 3 is a schematic cross-sectional view illustrating a display device according to another embodiment of the invention. With reference to FIG. 1A and FIG. 3, the display device 100c described in the present embodiment is similar to the display device 100a depicted in FIG. 1A, while one of the differences therebetween lies in that the second light-guiding bock 124c of the LGP 120c described herein has two recess portions C2 and C3. The recess portions C2 and C3 are respectively located on the upper surface 121c and the lower surface 123c and extend to the light-incident surface 125c. The positioning component 140c and the light-shielding component 160c are respectively located in the recess portions C2 and C3. Here, the cross-sectional area of the second light-guiding block 124c (having the recess portions C2 and C3) is smaller than the cross-sectional area of the first light-guiding block 122c. The light-guiding component 160c has a surface 162c away from the recess portion C3, and the surface 162c is lower than the lower surface 123c of the LGP 120c. Certainly, in another embodiment that is not shown in the drawings, the surface 162c of the light-guiding component 160c away from the recess portion C3 may also be substantially aligned to the lower surface 123c of the LGP 120c.

In the present embodiment, the second light-guiding block 124c has two recess portions C2 and C3, and the positioning component 140c and the light-shielding component 160c are respectively located in the recess portions C2 and C3. Therefore, the design of the recess portions C2 and C3 provided in the present embodiment effectively reduces the height difference between the positioning component 140c and the upper surface 121c of the LGP 120c and the height difference between the light-shielding component 160c and the lower surface 123c of the LGP 120c. Thereby, the display device 100c described herein may have the reduced thickness.

Figure 4:
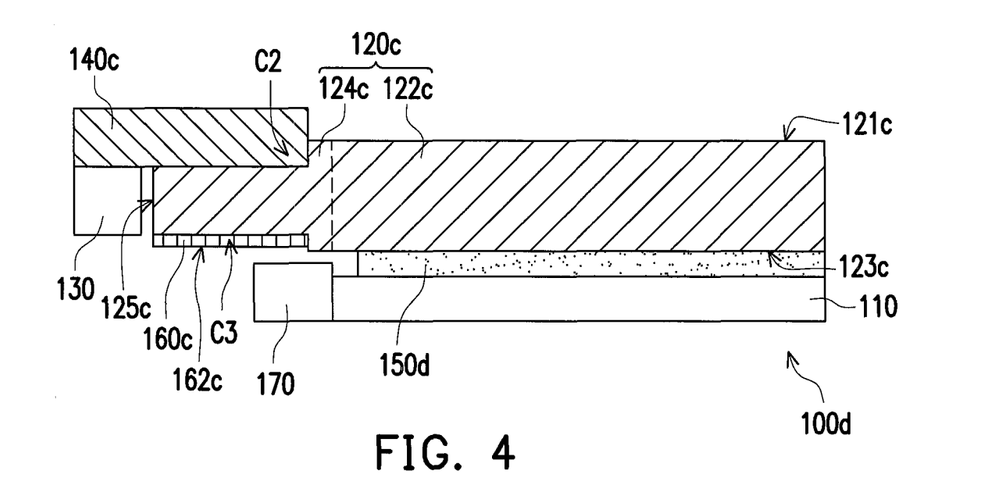
FIG. 4 is a schematic cross-sectional view illustrating a display device according to another embodiment of the invention.

FIG. 4 is a schematic cross-sectional view illustrating a display device according to another embodiment of the invention. With reference to FIG. 3 and FIG. 4, the display device 100d described in the present embodiment is similar to the display device 100c depicted in FIG. 3, while one of the differences therebetween lies in that the display device 100d described in the present embodiment further includes a connection component 170 that is connected to the display panel 110 and extended toward the recess portion C3 located on the lower surface 123c. Here, the connection component 170 is a flexible circuit board, a passive component, or a driving chip, and the invention is not limited thereto. One end of the connection component 170 is connected to the display panel 110 and serves to provide electric signals to the display panel 110, while the other end of the connection component 170 serves to be connected to a connection device that provides external signals.

In the present embodiment, the light-guiding component 160c is located in the recess portion C3, and the surface 162c of the light-shielding component 160c is lower than the lower surface 123c of the LGP 120c. Therefore, the thickness of the optical adhesive layer 150d need not be significant, and it is still likely to define an accommodation space that may accommodate the connection component 170 between the display panel 110 and the recess portion C3 of the second light-guiding block 124c. That is, the design of the recess portion C3 provided herein improves the flexibility of arranging the components of the display device.

Figure 5:
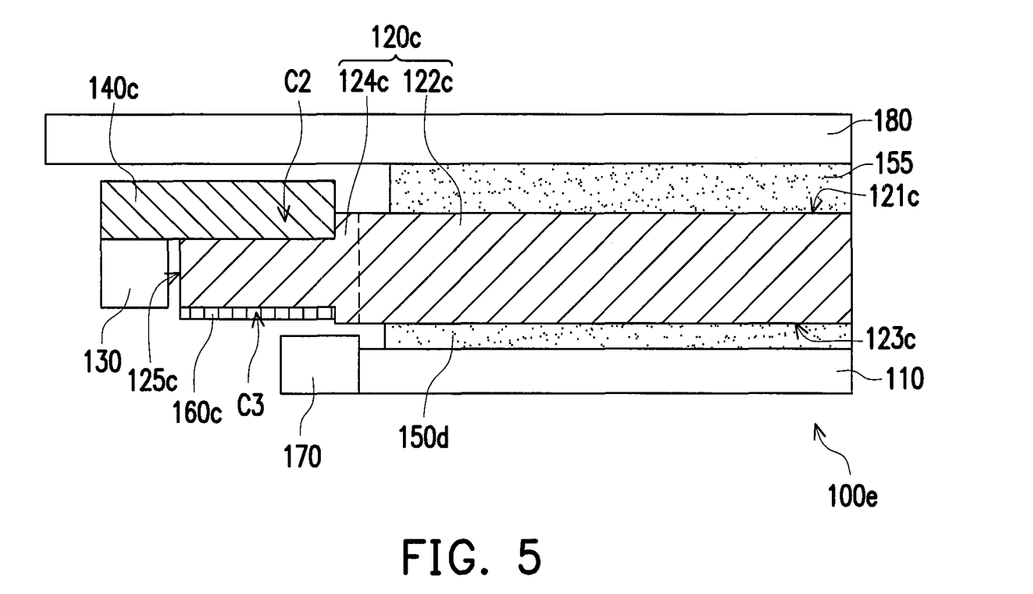
FIG. 5 is a schematic cross-sectional view illustrating a display device according to another embodiment of the invention.

FIG. 5 is a schematic cross-sectional view illustrating a display device according to another embodiment of the invention. With reference to FIG. 4 and FIG. 5, the display device 100e described in the present embodiment is similar to the display device 100d depicted in FIG. 4, while one of the differences therebetween lies in that the display device 100e described herein further includes an optical film layer 180 and an optical adhesive layer 155, so as to further ameliorate the display quality of the display device 100e. The optical film layer 180 is disposed on the upper surface 121c of the LGP 120c, and a dimension of the optical film layer 180 is substantially equal to a dimension of the first light-guiding block 122c. The optical adhesive layer 155 is disposed between the first light-guiding block 122c of the LGP 120c and the optical film layer 180, so as to fix the locations of the optical film layer 180 and the LGP 120c. Here, the optical film layer 180 is a diffuser, a light-enhancement sheet, a prism, a cover plate or a combination thereof, and the invention is not limited thereto.

As shown in FIG. 5, the thickness of the positioning component 140c is greater than the thickness of the light-shielding component 160c, and thus the thickness of the optical adhesive layer 155 is also required to be greater than that of the optical adhesive layer 150d. In most cases, according to the related art, to prevent the interference with the circuit board disposed on the surface of the LGP, the thickness of the resultant optical adhesive layer is from 10 μm to 300 μm. However, since the positioning component 140c and the light-shielding component 160c described in the present embodiment are both located in the recess portions C2 and C3 of the second light-guiding block 124c, the thickness of the optical adhesive layer 155 is less than that of the conventional optical adhesive layer, and the difference in the thicknesses is about the height of the recess portion C2. Besides, the thickness of the optical adhesive layer 150d is less than that of the conventional optical adhesive layer, and the difference in the thicknesses is about the height of the recess portion C3. In a word, the thicknesses of the optical adhesive layers 150 and 150d described herein are respectively less than that of the conventional optical adhesive layer, and thus the display device 100e described in the present embodiment may have the reduced thickness.

Figure 6:
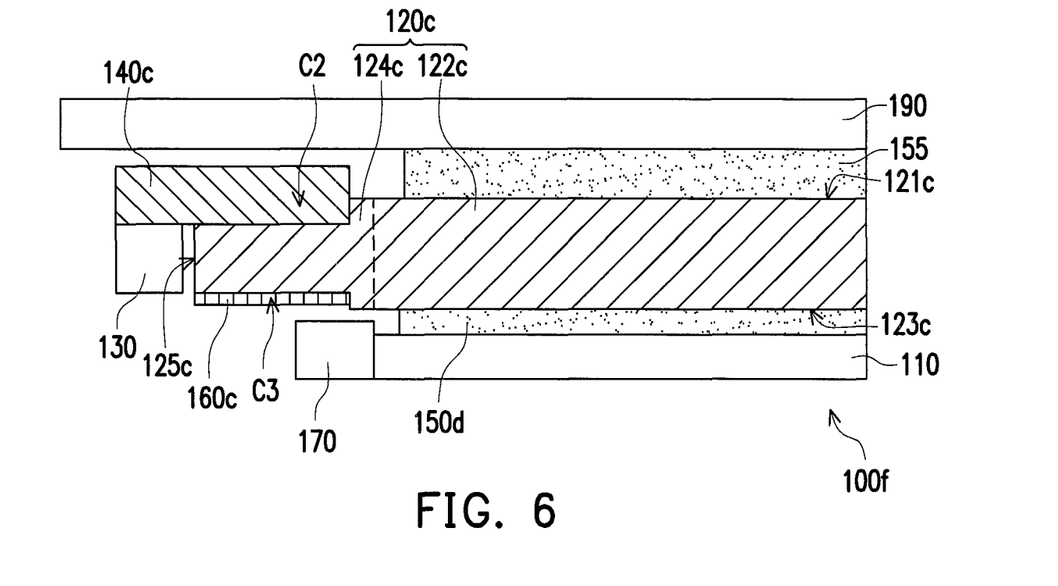
FIG. 6 is a schematic cross-sectional view illustrating a display device according to another embodiment of the invention.

FIG. 6 is a schematic cross-sectional view illustrating a display device according to another embodiment of the invention. With reference to FIG. 4 and FIG. 6, the display device 100f described in the present embodiment is similar to the display device 100d depicted in FIG. 4, while one of the differences therebetween lies in that the display device 100f described herein further includes a touch panel 190 and an optical adhesive layer 155. The touch panel 190 is disposed on the upper surface 121c of the LGP 120c, and a dimension of the touch panel 190 is greater than a dimension of the display panel 110. The optical adhesive layer 155 is disposed between the first light-guiding block 122c of the LGP 120c and the touch panel 190. At this time, the display device 100f described in the present embodiment is equipped with both the display panel 110 and the touch panel 190 and is thus capable of performing both the display function and the touch-control function. A cover plate or an anti-glare film may be adhered to the touch panel 190 by the optical adhesive (not show in the FIG. 6).

Figure 7:
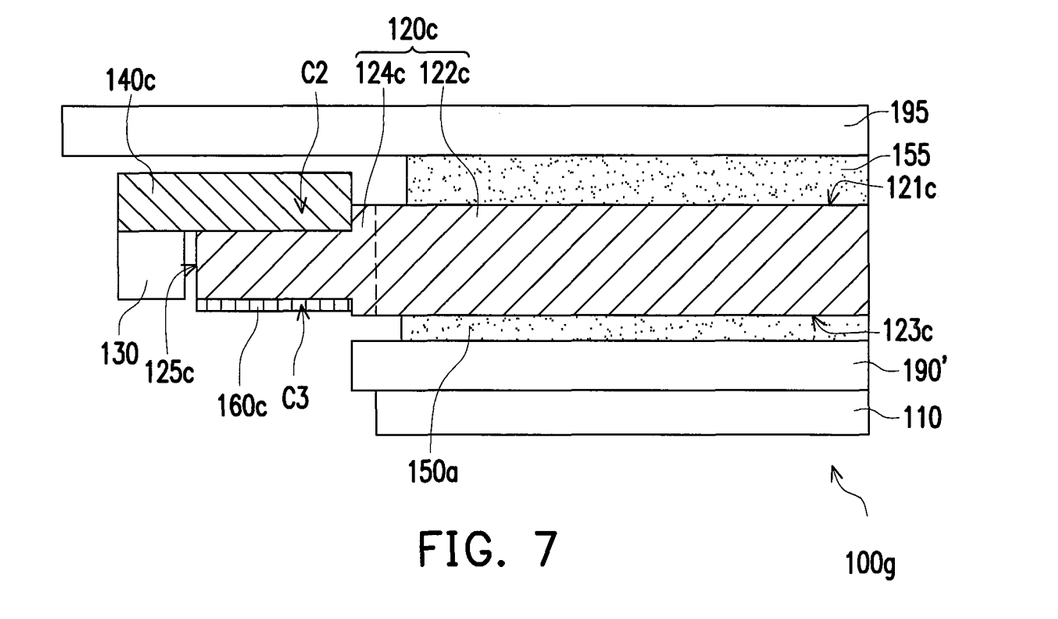
FIG. 7 is a schematic cross-sectional view illustrating a display device according to another embodiment of the invention.

FIG. 7 is a schematic cross-sectional view illustrating a display device according to another embodiment of the invention. With reference to FIG. 3 and FIG. 7, the display device 100g described in the present embodiment is similar to the display device 100c depicted in FIG. 3, while one of the differences therebetween lies in that the display device 100g described herein further includes two optical adhesive layers 150a and 155, a touch panel 190', and a cover plate 195. The optical adhesive layer 150a is disposed between the first light-guiding block 122c of the LGP 120c and the display panel 110. The touch panel 190' is disposed between the optical adhesive layer 150a and the display panel 110, which should not be construed as a limitation to the invention. In another embodiment, the touch panel 190' is disposed between the optical adhesive layer 155 and the cover plate 195. Additionally, according to the present embodiment, there may be an optical adhesive layer (not shown) between the touch panel 190' and the display panel 110 so as to adhere them to each other. The cover plate 195 is disposed on the upper surface 121c of the LGP 120c, and a dimension of the cover plate 195 is greater than a dimension of the display panel 110. The optical adhesive layer 155 is disposed between the first light-guiding block 122c of the LGP 120c and the cover plate 195. Since the display device 100g described in the present embodiment is equipped with both the display panel 110 and the touch panel 190', the display device 100g is thus capable of performing both the display function and the touch-control function.

Figure 8:
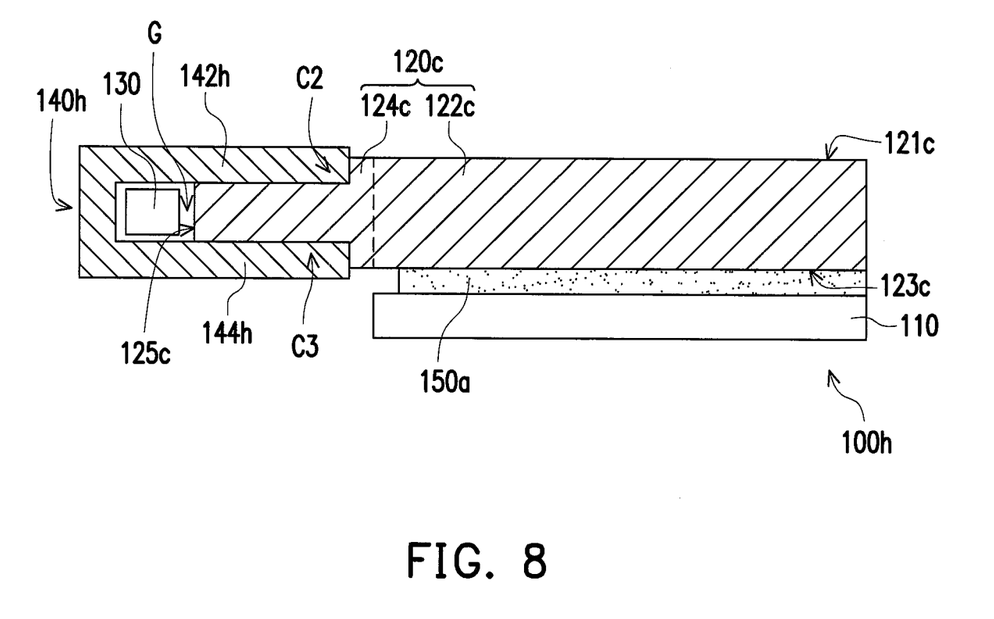
FIG. 8 is a schematic cross-sectional view illustrating a display device according to another embodiment of the invention.

FIG. 8 is a schematic cross-sectional view illustrating a display device according to another embodiment of the invention. With reference to FIG. 3 and FIG. 8, the display device 100h described in the present embodiment is similar to the display device 100c depicted in FIG. 3, while one of the differences therebetween lies in that the display device 100h described herein does not have the light-shielding component 160c, and that the positioning component 140h of the display device 100h is a reflection mask. Particularly, as shown in FIG. 8, the positioning component 140h acts to fix the location of the light source 130, the two opposite sides 142h and 144h of the positioning component 140h are respectively located in the recess portions C2 and C3, and the positioning component 14011 and the LGP 120c collectively define an accommodation space G where the light source 130 is accommodated.

To sum up, the LGP described herein has at least one recess portion in a region (i.e., the second light-guiding block) not corresponding to the display surface of the display panel, and the positioning component is disposed in the recess portion. Conventionally, the flexible circuit board electrically connected to the light source is disposed on the surface of the LGP; compared to the related art, the recess portion described in an embodiment of the invention reduces the height difference between the positioning component and the LGP. Thereby, the display device described herein may have the reduced thickness.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A display device comprising:
    a display panel having a display surface;
    a light guide plate disposed on the display surface of the display panel, the light guide plate having an upper surface and a lower surface opposite to each other, a light-incident surface, a first light-guiding block, and a second light-guiding block, wherein a display area of the display panel corresponds to the first light-guiding block, the second light-guiding block extends outside the display area of the display panel and has at least one recess portion, and the at least one recess portion is located on at least one of the upper surface and the lower surface and extends to the light-incident surface;
    a light source disposed beside the light-incident surface of the light guide plate; and
    a positioning component disposed on the second light-guiding block of the light guide plate and located in the at least one recess portion, the positioning component extending outside the at least one recess portion and fixing a location of the light source.

2. The display device as recited in claim 1, wherein the positioning component is a flexible circuit board, and the positioning component is electrically and structurally connected to the light source.

3. The display device as recited in claim 2, wherein the at least one recess portion is located on the upper surface, and the positioning component is located in the at least one recess portion.

4. The display device as recited in claim 2, wherein the at least one recess portion is located on the lower surface, and the positioning component is located in the at least one recess portion.

5. The display device as recited in claim 2, further comprising:
    a light-shielding component, wherein the number of the at least one recess portion is two, the recess portions are respectively located on the upper surface and the lower surface and extend to the light-incident surface, and the light-shielding component and the positioning component are respectively located in the recess portions.

6. The display apparatus as recited in claim 5, wherein the light-shielding component is a black tape layer or a white tape layer.

7. The display apparatus as recited in claim 5, wherein a surface of the light-shielding component away from the at least one recess portion is aligned to or lower than the lower surface of the light guide plate.

8. The display device as recited in claim 7, further comprising:
    a connection component connected to the display panel, the connection component extending toward the at least one recess portion located on the lower surface and comprising a flexible circuit board, a passive component, or a driving chip.

9. The display device as recited in claim 1, wherein the positioning component is a reflection mask, the number of the at least one recess portion is two, the recess portions are respectively located on the upper surface and the lower surface and extend to the light-incident surface, two respective sides of the positioning component are respectively located in the recess portions, the positioning component and the light guide plate define an accommodation space, and the light source is located in the accommodation space.

10. The display device as recited in claim 1, further comprising:
    a light-shielding component disposed on the second light-guiding block of the light guide plate.

11. The display device as recited in claim 1, further comprising:
    an optical adhesive layer disposed between the first light-guiding block of the light guide plate and the display panel.

12. The display device as recited in claim 1, further comprising:
    a touch panel disposed on the upper surface of the light guide plate, wherein a dimension of the touch panel is greater than a dimension of the display panel; and
    an optical adhesive layer disposed between the first light-guiding block of the light guide plate and the touch panel.

13. The display device as recited in claim 1, further comprising:
    a first optical adhesive layer disposed between the first light-guiding block of the light guide plate and the display panel;
    a touch panel disposed between the first optical adhesive layer and the display panel;
    a cover plate disposed on the upper surface of the light guide plate, wherein a dimension of the cover plate is greater than a dimension of the display panel; and
    a second optical adhesive layer disposed between the first light-guiding block of the light guide plate and the cover plate.

14. The display device as recited in claim 1, further comprising:
    an optical film layer disposed on the upper surface of the light guide plate; and
    an optical adhesive layer disposed between the first light-guiding block of the light guide plate and the optical film layer.

15. The display device as recited in claim 1, wherein the at least one recess portion has a bottom surface and a side surface, the side surface is connected to the bottom surface and the upper surface of the light guide plate, and the bottom surface is perpendicular to the light-incident surface.

16. The display device as recited in claim 15, wherein the side surface comprises a vertical surface, an inclined surface, or an arc-shaped surface.

17. The display device as recited in claim 1, wherein the light source is a plurality of light-emitting diodes, and a light-emitting area of the light source is substantially equal to or smaller than an area of the light-incident surface.

* * * * *